(12) United States Patent
Chang

(10) Patent No.: US 7,246,633 B2
(45) Date of Patent: Jul. 24, 2007

(54) SHOCK ABSORBER

(76) Inventor: Tsung-Hsi Chang, No. 5, Alley 44, Lane 138, Sec. 1, Dongshan Rd., Beitun District, Taichung City (TW) 406

( * ) Notice: Subject to any disclaimer, the term of this patent is extended or adjusted under 35 U.S.C. 154(b) by 288 days.

(21) Appl. No.: 11/019,462

(22) Filed: Dec. 23, 2004

(65) Prior Publication Data
US 2005/0155849 A1    Jul. 21, 2005

(30) Foreign Application Priority Data
Dec. 31, 2003    (TW) .............................. 92137841 A

(51) Int. Cl.
*F16K 17/36* (2006.01)
(52) U.S. Cl. .................................... 137/38
(58) Field of Classification Search ............... 137/38, 137/39
See application file for complete search history.

(56) References Cited

U.S. PATENT DOCUMENTS

| | | | | |
|---|---|---|---|---|
| 3,747,616 A | * | 7/1973 | Lloyd ........................... | 137/38 |
| 4,485,832 A | * | 12/1984 | Plemmons et al. ........... | 137/38 |
| 4,565,208 A | * | 1/1986 | Ritchie et al. ................ | 137/38 |
| 5,209,252 A | * | 5/1993 | Perle ............................ | 137/38 |
| 6,213,142 B1 | * | 4/2001 | Engdahl ....................... | 137/38 |

* cited by examiner

*Primary Examiner*—Stephen M. Hepperle
(74) *Attorney, Agent, or Firm*—Browdy and Neimark, PLLC

(57) ABSTRACT

A shock switch main has a main member, a resting device and a return device. The main member has a chamber therein, a first passageway communicated to the chamber, a resting portion at a bottom of the chamber, an aperture on the resting portion, a vertical chamber communicated with the aperture and a second passageway communicated with the vertical chamber. The closing device is rested on the resting portion adapted to drop into the aperture. A return assembly is provided in the vertical chamber, which is moved to move the closing device back to the resting portion from the aperture.

20 Claims, 5 Drawing Sheets

SHOCK ABSORBER

BACKGROUND OF THE INVENTION

1. Field of the Invention

The present invention relates generally to a safety application of gas, and more particularly to a shock switch.

2. Description of the Related Art

There are many places like Taiwan located at a connection region of the Pacific plate and Eurasia plates, such that Taiwan is one of the regions where earthquakes occur frequently. Earthquakes usually cause fire because of gas leakage that takes human lives and causes property damage. Although we are taught to turn off power and gas, most people are attempting to escape, and there is no time to turn off power and gas prior to escape. That is why earthquakes always take a huge damage.

SUMMARY OF THE INVENTION

The primary objective of the present invention is to provide a shock switch, which closes the gas piping automatically when earthquakes occur. The shock switch of present invention does not need power and has a simple structure. Gravity is relied on to drop an object to close gas pipes in use. The present invention also provides a return assembly to return the object to the initial location and open the gas pipes again.

According to the objective of the present invention, a shock switch comprises a main member having a chamber therein, a first passageway communicated to the chamber, a resting portion at a bottom of the chamber, an aperture on the resting portion, at least a closing device rested on the resting portion adapted to drop into the aperture, a vertical chamber communicated with the aperture and a second passageway communicated with the vertical chamber. A return assembly is provided in the vertical chamber, which is moved to move the closing device back to the resting portion from the aperture.

DETAILED DESCRIPTION OF THE INVENTION

Figure 1:
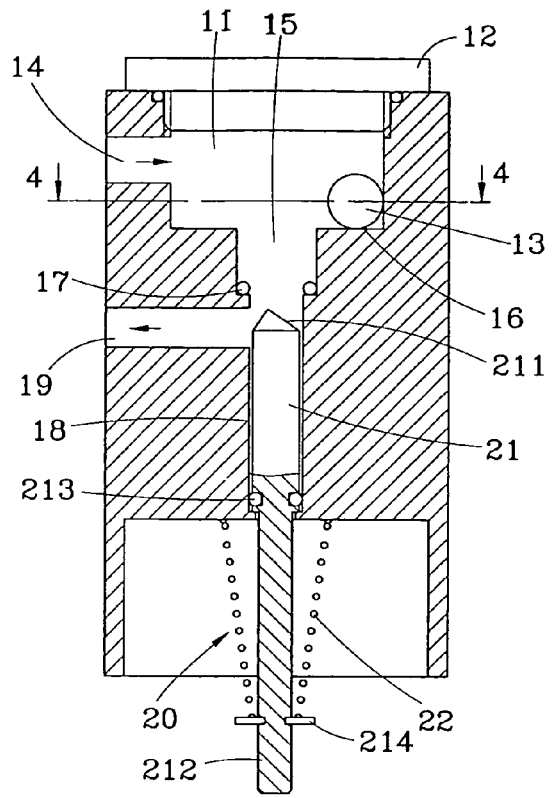
FIG. 1 is a sectional view of a first preferred embodiment of the present invention.
Figure 4:
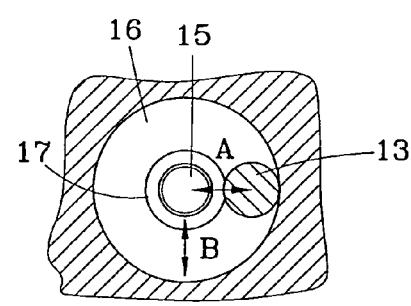
FIG. 4 is a sectional view along the 4-4 line of FIG. 1.

As shown in FIG. 1, a shock switch of the first preferred embodiment of the present invention comprises:

A main member 10 has a chamber 11, which could be round, rectangular or triangular, a lid 12 at a top thereof, a closing device 13, which is a ball in the present preferred embodiment, in the chamber 11, a first passageway 14 communicated with the chamber 11 to be connected to an input hose (not shown) and an aperture 15 at a bottom wall of the chamber 11 where a resting portion 16 is defined at the bottom wall of the chamber around the aperture 15. As shown in FIGS. 1 and 4, the resting portion 16 entirely and continuously surrounds aperture 15 at a constant level and width around the aperture 15. In the present preferred embodiment, a leakproof device 17 is installed in the aperture 15 for sealing. The main member further has a vertical chamber 18 under the aperture 15 and communicated therewith and a second passageway 19 communicated with the vertical chamber 18 to be connected with an output hose (not shown).

A return assembly installed in the vertical chamber 18 of the main member 10 has a bar 21 having a pushing end 211, which has an inclined face at the end of the bar 21 in the present preferred embodiment, and a pressing section 212 opposite to the pushing end 211. The pressing section 212 has a smaller diameter than that of bar 21 and is extruded out of the main member 10. A flexible ring 213 is fitted to the bar 21 for leakproofing the main member 10, and a ring 214 is fitted to the pressing section 212 at a portion out of the main member 10.

When an earthquake occurs, the closing device 13 drops into the aperture 15 from the resting portion 16 due to vibration of main member 10 to seal the aperture 15 and close the gas supply. Upon movement of the return assembly 20, the bar 21 is moved upward to return the closing device 13 back to the resting portion 16 and restore the gas supply. Thus, the switch of the present invention closes the gas supply during an earthquake, and the switch restores the gas supply when the bar 21 is pushed inward (when the main member 10 is fixed) or the main member 10 is pushed downward (when the bar 21 is fixed).

To facilitate the operation of the switch of the present invention, the switch is further provided with a spring 22 fitted to the pressing section 212 of the bar 21 and between the ring 214 and the main member 10.

Figure 2:
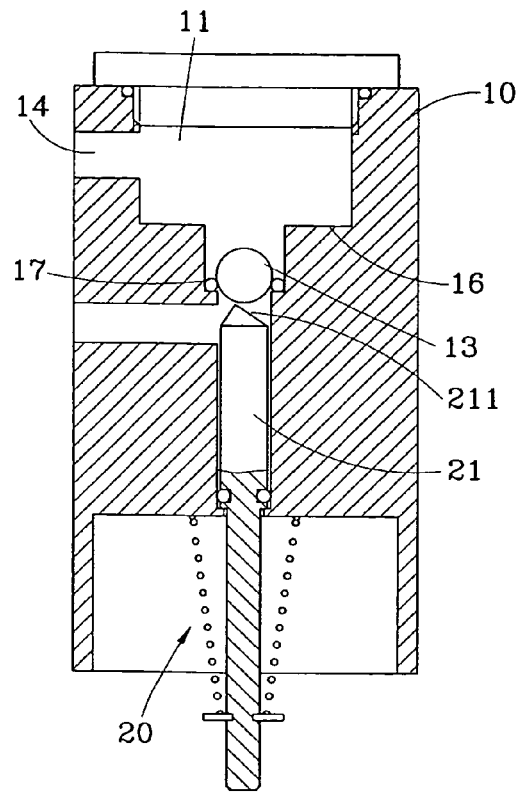
FIG. 2 and FIG. 3 are sectional views of the first preferred embodiment of the present invention, showing how the switch works.
Figure 3:
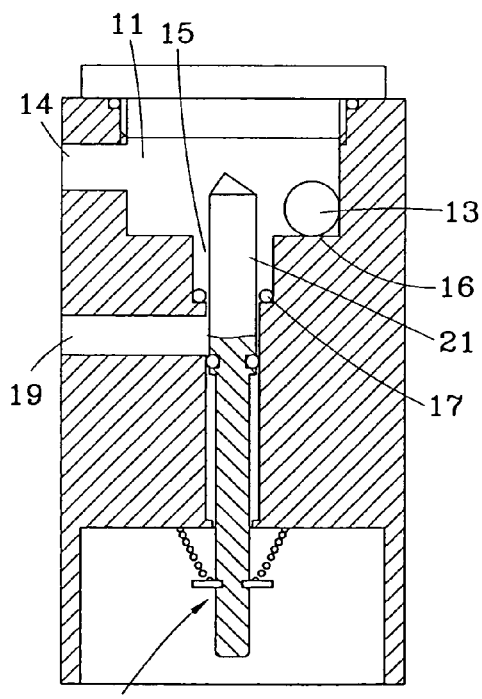

In a steady condition, the closing device 13 rests on the resting portion 16 of the chamber 11, the bar 21 is urged by the spring 22 to locate the pushing end 21 1 out of the aperture 15. When an earthquake occurs, the closing device 13 drops into the aperture 15 from the resting portion 16 because of vibration of main member 10 and gravity to close the gas supply, as shown in FIG. 2. The user has to push the bar 21 inward to move the closing device 13 back to the chamber 11 up from the aperture 15. The pushing end 211 helps the closing device 13 to drop onto the resting portion 16, opens the aperture 15 to restore the gas supply when the gas supply is needed again. After the bar 21 is released, the spring 22 moves the closing device 13 back to the initial position, as shown in FIG. 3.

Figure 5:
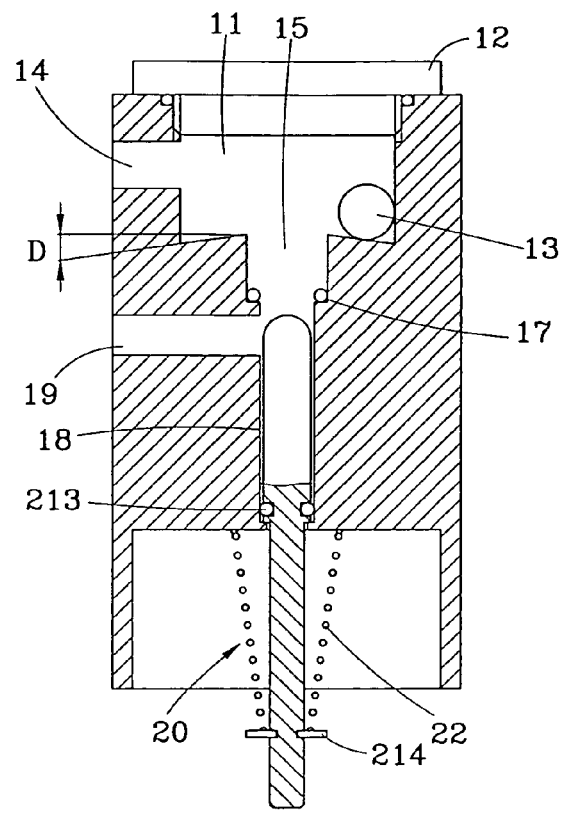
FIG. 5 is a sectional view of the first preferred embodiment of the present invention, showing the chamber.
Figure 6:
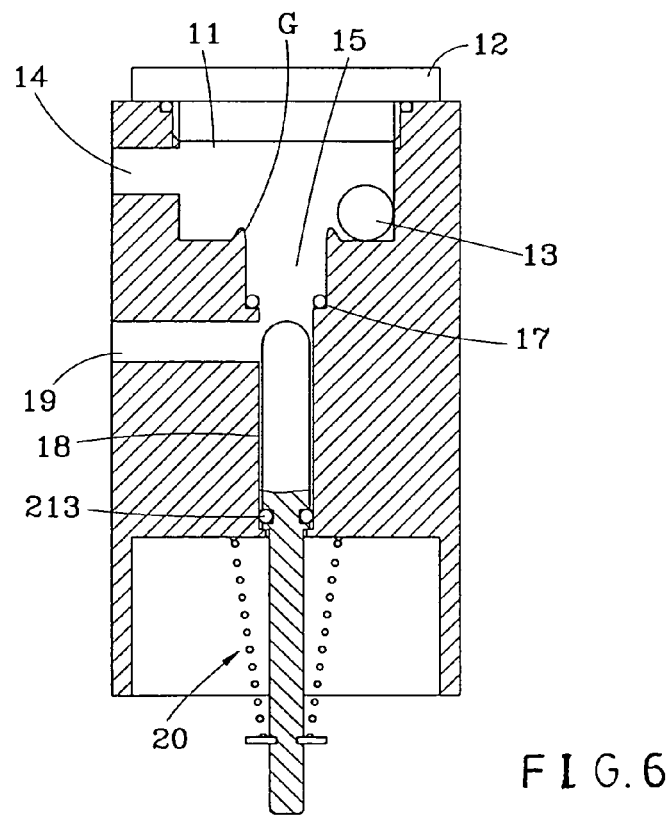
FIG. 6 is a sectional view of the first preferred embodiment of the present invention, showing another chamber.
Figure 7:
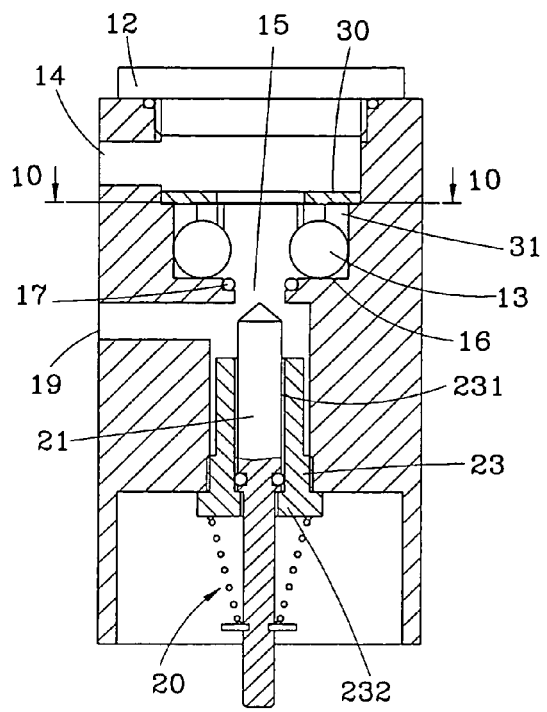
FIG. 7 is a sectional view of a second preferred embodiment of the present invention.
Figure 9:
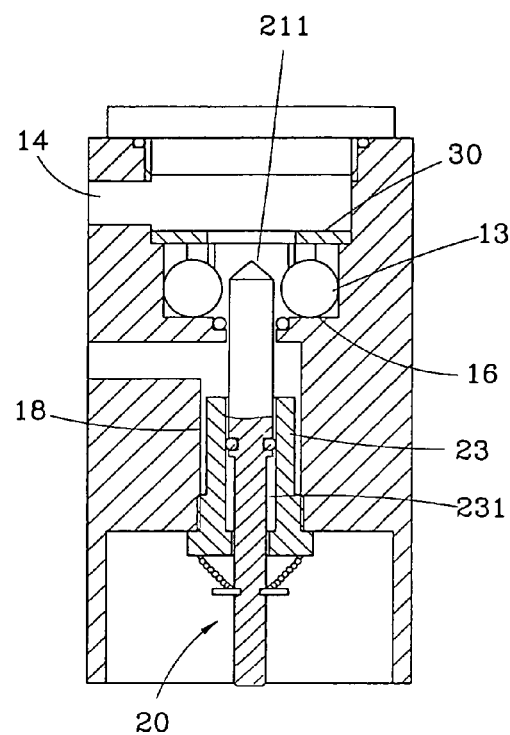
FIG. 8 and FIG. 9 are sectional views of the second preferred embodiment of the present invention, showing how the switch works.
Figure 8:
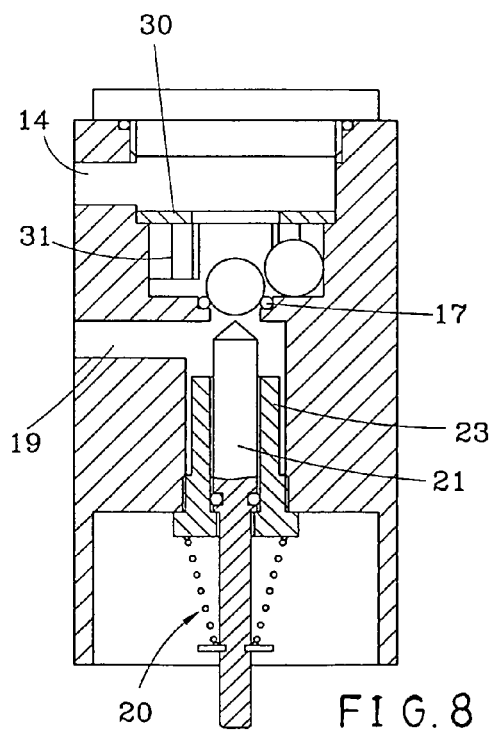

It has to be mentioned that the resting portion 16 does not have to be horizontal. As shown in FIG. 5, the resting portion 16 has a slope D from the aperture 15 to a margin of the resting portion 16. The slope D restricts movement of the closing device 13 so that the vibration from an earthquake has to be greater than a predetermined value to drop the closing device 13 into the aperture 15. As shown in FIG. 6, the resting portion 16 has an annular protrusion G around the aperture 15. A height of the protrusion G has the same function as the slope D of the resting portion 16. The pushing end 211 of the bar 21 may have shapes other than that of the inclined face. The pushing end 211 can be a tip end, as shown in FIG. 5, a convex or ball end, as shown in FIG. 6, and so on. The pushing end 211 of the bar 21 is to lift the closing device 13 out of the aperture 15, and soon after the closing device 13 leaves the aperture 15, the pushing end 211 does not hold the closing device 13 anymore to drop it onto the resting portion 16. The slope D of the resting portion 16 and the protrusion G can restrict the closing device 13 on the resting portion 16.

As shown in FIG. 4, if the orientation of the vibration of earthquake is along the arrow A, the closing device 13 has greater chance dropping into the aperture 15, and if the orientation is along the arrow B, the closing device 13 may just go around in the chamber like a satellite. The present inventor further provides the second preferred embodiment to overcome the drawback above.

As shown in FIG. 7 to FIG. 10, a shock switch of the second preferred embodiment of the present invention, which is similar to the switch of the first preferred embodiment, except that the return assembly 20 further has a hub 23 fixed in the vertical chamber 18 by glue or threads. The hub 23 has a hole 231, which is open at opposite ends of the hub 23, and an annular flange 232 at the end thereof extending out of the main member 10. The bar 21 is received in the hole 231 of the hub 23.

Figure 10:
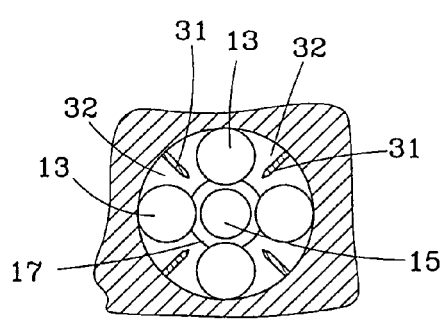
FIG. 10 is a sectional view along the 10-10 line of FIG. 7.

The switch of the second preferred embodiment further has four closing devices 13 in the chamber 11. A separator 30 is provided in the chamber 11 of the main member 10, on which bores are provided to flow gas therethrough. The separator 30 has four ribs 31 on a bottom thereof to divide the chamber 11 into four sub-chambers 32, in which the closing devices 13 are received respectively, as shown in FIG. 10. It has to be mentioned here, the chamber 11 can be divided into two or three sub-chambers (not shown) by the ribs 31 also.

As a result, any orientation of the vibration of earthquake will drop at least one of the closing devices 13 into the aperture 15.

If two or more closing devices 13 drop into the aperture 15 together, it might be jammed when the bar 21 moves upward. To overcome the drawback, a width of the resting portion 16 is less than a diameter of the closing device 13, and a distance between the resting portion 16 and the ring 21 3 is less than the diameter of the closing device 13, such that the closing device 13 still has a portion remaining in the chamber 11 when it drops into the aperture 15 to block the other closing devices 13 dropping into the aperture 15. As a result, only one closing device 13 can drop into the aperture 15 eliminates the closing devices 13 jamming.

The closing devices 13 have portions beyond the resting portion 16 because the diameters of the closing devices 13 are greater than the width of the resting portion 16. This permits the closing device 13 in the aperture 15 to be returned to its original location when the bar 21 pushes it upward.

Figure 11:
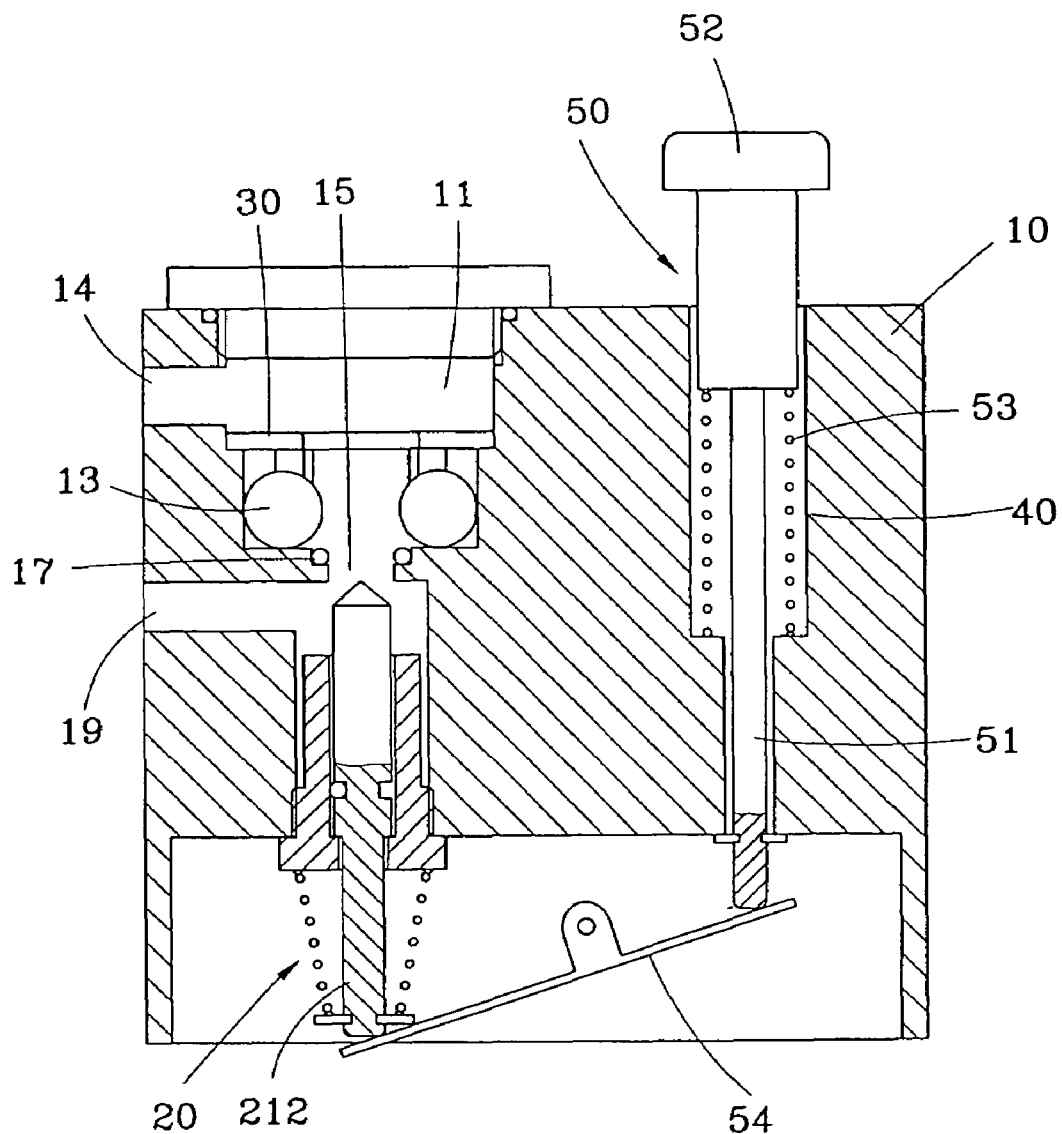
FIG. 11 is a sectional view of a third preferred embodiment of the present invention.
Figure 12:
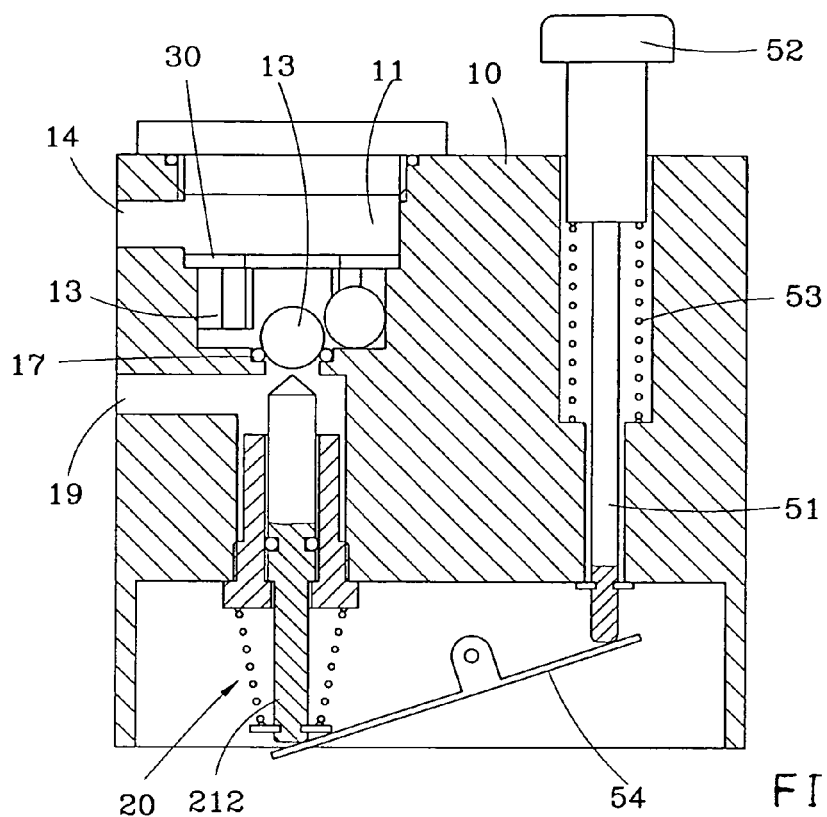
FIG. 12 and FIG. 13 are sectional views of the third preferred embodiment of the present invention, showing how the switch works.
Figure 13:
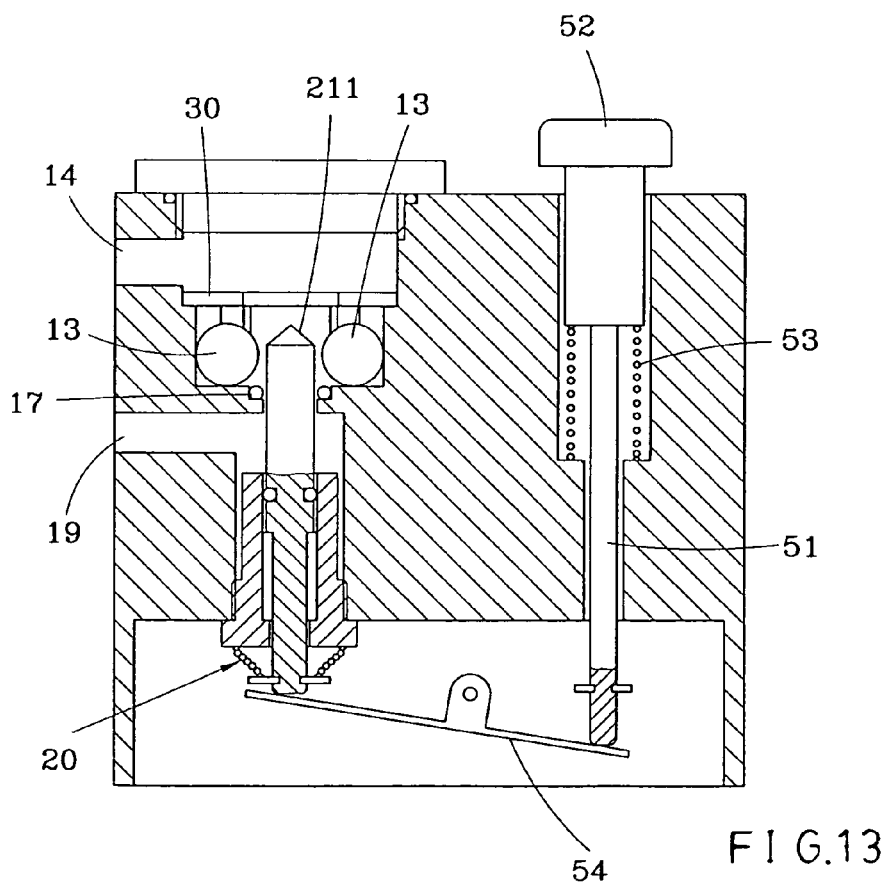

As shown in FIG. 11 to FIG. 13, a shock switch of the third preferred embodiment of the present invention is provided for convenient operation. The main member 10 is further provided with a through hole 40 at an opposite side thereof. A pressing assembly 50 is provided in the through hole 40, which has a movable bar 51 received in the through hole 40, a button 52 at an end of movable bar 51 extruded out of the main member 10 and a spring 53 fitted to the movable bar 51.

A lever 54 is pivoted in the main member 10 connected to the pressing assembly 50 and the pressing section 212 of the bar 21 respectively. The button 52 is pressed by operator to move the bar 21 via the lever 54 to return the closing device 13.

What is claimed is:

1. A shock switch comprising:
a main member having a chamber therein, a first passageway communicated to the chamber, wherein the first passageway is adapted to connect a gas supply to issue gas into the main member, a resting portion at a bottom of the chamber, entirely and continuously surrounding an aperture through the resting portion, the resting portion being at a constant level and width around the aperture, at least one closing device on the resting portion adapted to drop into the aperture, a vertical chamber communicating with the aperture and a second passageway communicating with the vertical chamber, and a return assembly provided in the vertical chamber, which returns the closing device back to the resting portion from the aperture.

2. The shock switch as defined in claim 1, wherein a diameter of the closing device is greater than a width of the resting portion.

3. The shock switch as defined in claim 1, wherein the closing device has a portion out of the aperture when the closing device drops into the aperture.

4. The shock switch as defined in claim 1, wherein the resting portion is sloped downward from the aperture to a periphery of the chamber.

5. The shock switch as defined in claim 1, wherein the resting portion has a protrusion around the aperture.

6. The shock switch as defined in claim 1, wherein the return assembly has a bar having a pushing end, the pushing end having a convex portion.

7. The shock switch as defined in claim 6, wherein the bar further has a pressing section with which the bar is inserted into the vertical chamber out of the main chamber, a flexible ring being fitted to the bar and a ring provided to the pressing section.

8. The shock switch as defined in claim 7, wherein the return assembly further has a spring fitted to the pressing section of the bar to urge the ring and the main member respectively.

9. The shock switch as defined in claim 6, wherein the return assembly further has a hub received in the vertical chamber, which has a hole open at opposite ends thereof to insert the bar therein and a flange.

10. The shock switch as defined in claim 1, wherein the main member has a through hole at an opposite side thereof, in which a pressing assembly is provided; and a lever is provided to connect the pressing assembly and the pressing section of the bar respectively.

11. The shock switch as defined in claim 1, further comprising a leakproof device received in the aperture.

12. A shock switch comprising:
a main member having a chamber therein,
a first passageway communicated to the chamber,
wherein the first passageway is adapted to connect a gas supply to issue gas into the main member,
a resting portion at a bottom of the chamber,
an aperture on the resting portion,
at least a closing device rests adapted to drop into the aperture, a vertical chamber communicated with the aperture and a second passageway communicated with the vertical chamber, and a return assembly provided in the vertical chamber, which is moved to move the closing device back to the resting portion from the aperture, wherein the main member has ribs in the chamber to divide the chamber into several sub-chambers.

13. The shock switch as defined in claim 12, wherein the closing device has a portion out of the aperture when the closing device drops into the aperture.

14. The shock switch as defined in claim 12, wherein the resting portion is sloped downward from the aperture to a periphery of the chamber.

15. The shock switch as defined in claim 12, wherein the resting portion has a protrusion around the aperture.

16. A shock switch comprising:
a main member having a chamber therein,
a first passageway communicated to the chamber,
wherein the first passageway is adapted to connect a gas supply to issue gas into the main member,
a resting portion at a bottom of the chamber,
an aperture on the resting portion,
at least a closing device rests adapted to drop into the aperture,
a vertical chamber communicated with the aperture and a second passageway communicated with the vertical chamber, and
a return assembly provided in the vertical chamber, which is moved to move the closing device back to the resting portion from the aperture, wherein the main member has a through hole at an opposite side thereof, in which a pressing assembly is provided; and a lever is provided to connect the pressing assembly and the pressing section of the bar respectively.

17. The shock switch as defined in claim 16, wherein the main member has ribs in the chamber to divide the chamber into several sub-chambers.

18. The shock switch as defined in claim 17, wherein each of the sub-chambers has the closing device therein respectively.

19. The shock switch as defined in claim 16, wherein the pressing assembly has a movable bar received in the through hole and a button at an end of the movable bar extending out of the main member.

20. The shock switch as defined in claim 16, wherein the lever is connected to the movable bar and the pressing section of the bar.

\* \* \* \* \*